Jan. 26, 1960

D. E. RAUDABAUGH 2,922,927

ELECTRICAL APPARATUS BUSHING

Filed March 29, 1956

INVENTOR.
D.E. Raudabaugh.
BY
Kenneth W. Miller
ATTORNEY.

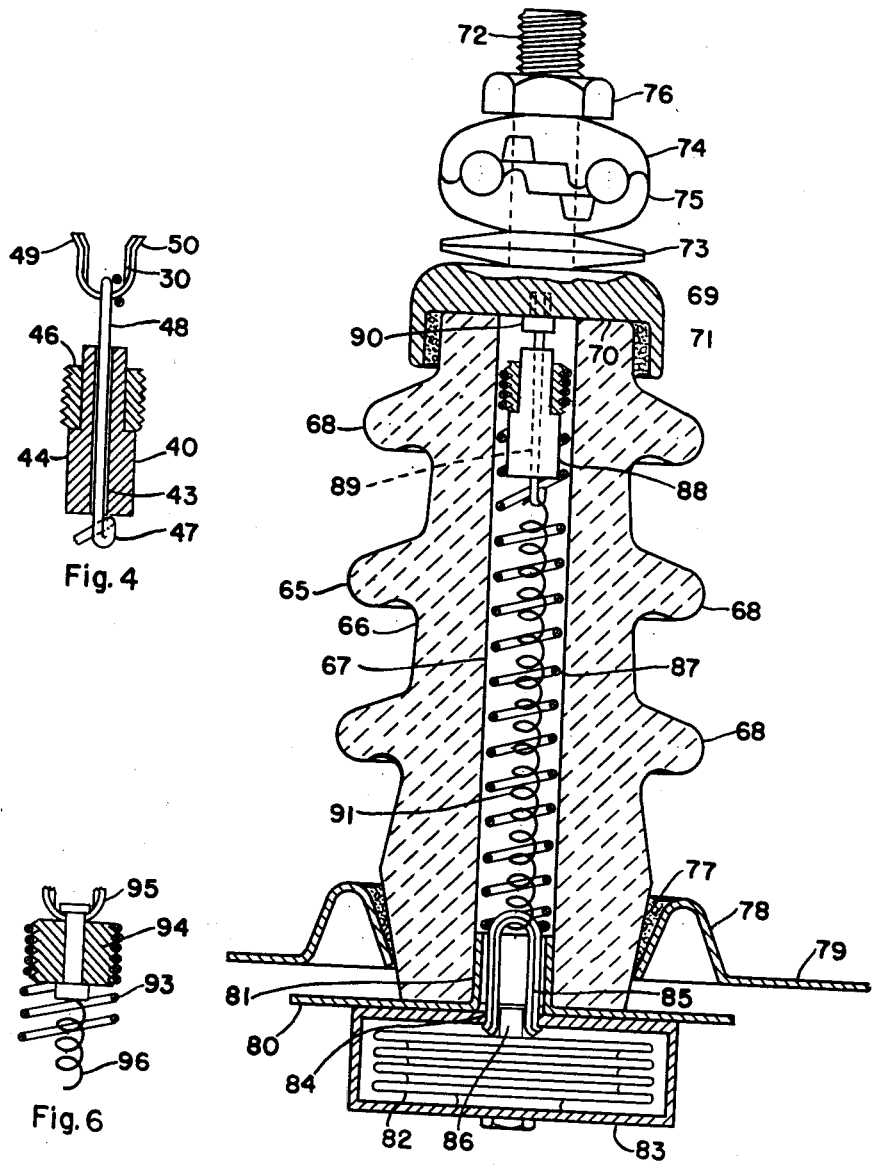

Jan. 26, 1960     D. E. RAUDABAUGH     2,922,927
ELECTRICAL APPARATUS BUSHING
Filed March 29, 1956     3 Sheets-Sheet 3

INVENTOR.
D. E. Raudabaugh.
BY
Kenneth W. Miller
ATTORNEY.

United States Patent Office 2,922,927
Patented Jan. 26, 1960

2,922,927

ELECTRICAL APPARATUS BUSHING

Donald E. Raudabaugh, Mansfield, Ohio, assignor to The Ohio Brass Company, Mansfield, Ohio, a corporation of New Jersey Application March 29, 1956, Serial No. 574,919

4 Claims. (Cl. 317—12)

This invention relates to the capacitor art and, more generally, to the art pertaining to container apparatus for electrical equipment and to the art pertaining to electric bushings.

In the art pertaining to electric power transmission and distribution, it is known to connect capacitors in shunt across a distribution line to improve the power factor of a circuit or in series with a transmission line to modify the impedance of the transmission line and increase its power handling capacity. In either application, the capacitors may be connected in banks, either in series or in parallel, or in multiple banks with a number of capacitors connected in series strings which are in turn connected in parallel.

Capacitors of the type referred to above, ordinarily constitute a container or housing which encloses a number of capacitor elements, with an appropriate dielectric medium, such as oil or gas, surrounding the condenser, and appropriate lead-through bushings for connecting the condensers to the conductors of the external circuit. The condensers are ordinarily formed in a size or capacity which is adapted for manufacture and the several capacitor elements are connected in series or parallel, or both, in order to obtain the desired total electrical capacity.

The uses of electrical capacitors, referred to above, present certain problems which, in many respects, are peculiar to the capacitor art alone. Particularly, the capacitors are permanently connected to the lines with which they are associated and form a part of the transmision or distribution system as the case may be. The individual capacitor elements are subject to failure or breakdown of the dielectric portion of those elements and the resultant change of condition is in many instances impossible to detect at the time that the failure takes place. For example, an individual element of several elements which are connected in series in a given capacitor, may fail or become shorted, so that the capacitor presents a lower reactance to the line and, hence, draws a larger current than would otherwise be the case. In such circumstances, fusing arrangements would be inadequate to remedy the situation, inasmuch as the increase in current resulting from the failure of the individual element might only be in the order of 10% over the normal current. Similarly, an entire capacitor might become short circuited and, by reason of being connected in series with capacitors in a string, the total change of current would be insufficient to operate such fusing devices.

Likewise, overload circuit breakers are ineffective for the same reason, and, additionally, for the reason that large transients ordinarily occur in the system which would cause false operation of a circuit breaker of the usual type.

To this extent, the problem is generally similar to that involved in certain other types of electrical equipment. However, in the capacitor art, a further factor is involved; namely, that the presence of a failed capacitor element in a capacitor, together with the continuation of the flow of electric current, is accompanied by arcing in the dielectric portion of the element with a consequent generation of gases due to the vaporizing of the insulating or dieletric medium of the element or the dielectric medium of the capacitor by the arc. Such gas generation ordinarily continues until the entire capacitor explodes. The condition, of course, may be a cumulative one in which several capacitor elements or capacitors will fail in succession until a system overload occurs.

The present invention is concerned with a remedy for the above described situation and there is disclosed and described herein a power capacitor which avoids the difficulties hereinbefore described. According to the invention, a capacitor is provided with a circuit interruption arrangement which is incorporated in the bushing of the capacitor. The circuit interrupter is in two parts, either of which may operate independently of the other. In the one part, there is provided interrupter apparatus which is responsive to an increase in the pressure of gas in the interior of the capacitor housing, and, when that pressure increases beyond a certain amount, the circuit to the capacitor elements within that housing is broken. Such interruption apparatus functions particularly where there has been a failure of only one element of the capacitor so that the pressure within the housing increases slowly over a period of time.

In the other interrupter part, there is provided a thermal interrupter or fuse in which the circuit to the elements is interrupted when the current to the capacitor increases very substantially, such as might be caused by a complete short circuit within the capacitor. Thus, the main circuits are protected, particularly against direct short circuits which are produced by failure of a single capacitor, or against progressive failure of a series of capacitors, and the obvious damages and hazards due to explosion of the individual capacitors is obviated.

Additionally, there is incorporated in the capacitor, in connection with the aforesaid interruption apparatus, an indicator device or telltale by which an observer can determine whether a failure has occurred in any given capacitor. This feature is important in that the condition of a capacitor or bank of capacitors may be determined by observation alone.

Accordingly, it is a principal object of the invention to provide a method of and means for protecting capacitors in electric power transmission and distribution systems.

Another object of the invention is to provide pressure and electric current responsive means operatively associated with electric power capacitors.

Still another object of the invention is to provide a positively operable circuit interrupting means which may be incorporated in an electric power capacitor and which will function to protect the capacitor and its associated circuits.

A still further object of the invention is to provide an improved bushing for electric power capacitors which incorporates improved contacting means for the condenser elements and which incorporates circuit interrupting means and a capacitor condition indicator.

A more general object of the invention is to prevent explosions of enclosed electric power equipment.

The invention will be more clearly understood by reference to the detailed specification and claims taken in connection with the appended drawings, in which Fig. 1 is a view, partly in section and partly broken away, of a bushing constructed in accordance with the invention;

Fig. 4 is a view partly in section of the fuse block and link of the bushing of Fig. 1;

Fig. 5 is a view, similar to that of Fig. 1, of a bushing which comprises a second embodiment of the invention;

Fig. 6 is a fragmentary view intended to represent further embodiments of the invention;

Figure 2:
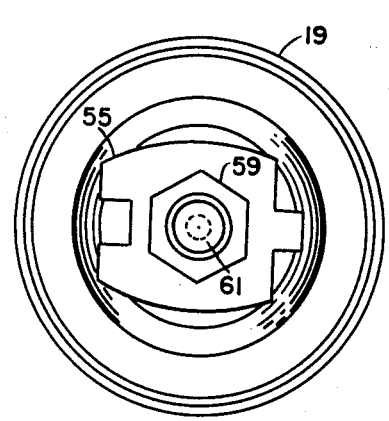
Fig. 2 is a plan view taken in the direction 2—2 in Fig. 1.
Figure 3:
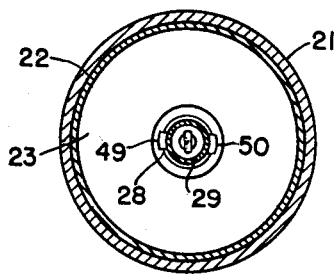
Fig. 3 is a sectional view taken in the direction 3—3 in Fig. 1.
Figure 1:
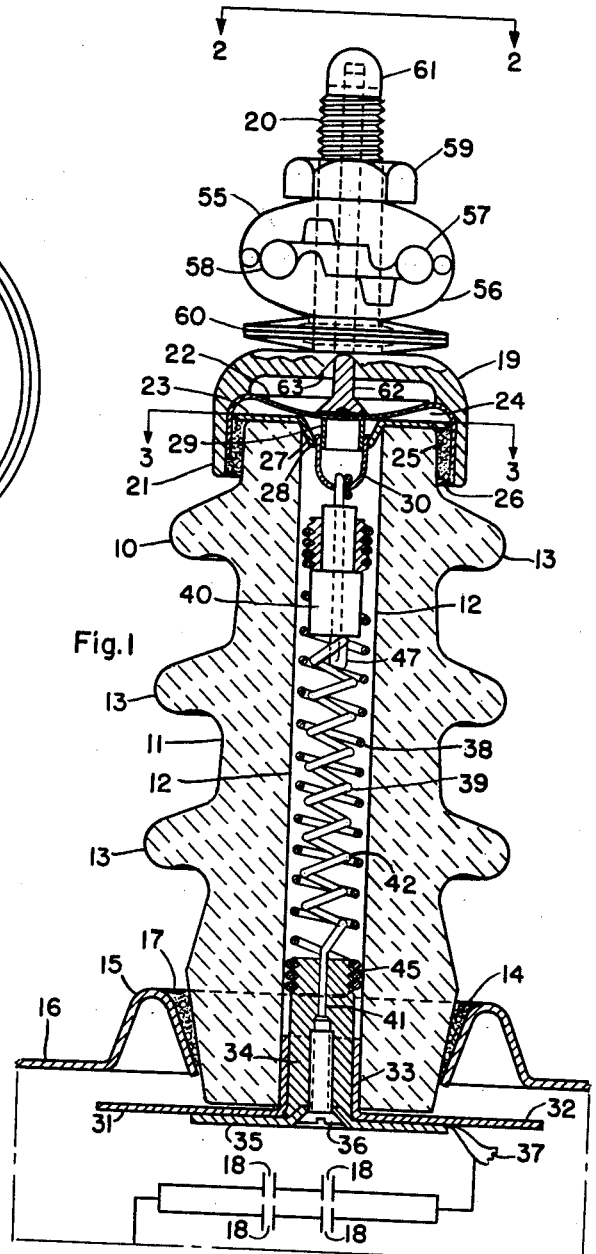

Referring now to Fig. 1, the bushing 10 comprises an elongate ceramic member 11 which is formed with an opening 12 longitudinally through the member, and a plurality of petticoats or skirts 13 for increasing the leakage distance along the outside of the member. The ceramic member 11 is formed with a tapered surface 14 at the lower end thereof to cooperate with an annular flange 15 of a housing 16. The surface 14 is metallized so that a soldered joint and seal 17 may be formed between the ceramic member and the housing.

As shown and described herein, the housing 16 constitutes an enclosure for a plurality of capacitor elements, illustrated symbolically at 18, to constitute a power capacitor. The invention is, however, as hereinafter set forth, useful for application to apparatus other than capacitors.

The bushing 10 serves as a terminal for the capacitor, providing electrical connection from the capacitor elements within the housing 16 to an external circuit, and also to protect the capacitor by responding to the pressure within the interior of the housing 16 and interrupt the connection to the elements when the gas pressure within the housing increases sufficiently.

The bushing 10 includes, at the upper end of the ceramic member 11, a metallic terminal member 19 having an elongate threaded upper part 20 and an open annular lower part 21 which extends over the upper end of the ceramic member 11. A diaphragm 22 is fitted in the interior of the open part 21 and a disclike plate 23 is disposed below the diaphragm 22 to form a chamber 24. The periphery of the plate 23 and the depending portions of the diaphragm 22 are suitably brazed or welded to each other and to the part 21 of the member 19. The plate 23 and diaphragm 22 are soldered to the metallized upper part 25 of the ceramic member 11 and a seal 26 is formed between the inside of the part 21 and the diaphragm 22, and the ceramic body 11. The plate 23 has a projecting central portion 27 which is fitted into the opening 12.

The plate 23 has an opening 28 in the downwardly projecting portion 27 which provides communication between the interior of the opening 12 and the chamber 24. The diaphragm 22 carries a tubular locking piece 29 which projects into the opening 28 and holds a U-shaped piece 30 to maintain an electrical connection between the piece 30, the plate 23, and the terminal member 19, or to release the piece 30 to break the electrical connection. To this end the diaphragm 22 is a two position device, resting either in the position shown in Fig. 1, or, upon increase in gas pressure in chamber 24, in an inverted position in which the piece 29 is withdrawn from the opening 28 and the piece 30.

The plate 23 is designated herein as a holding member and the U-shaped piece 30 as a latching member.

At its lower end, the bushing 10 is provided with an annular insulating member 31 having a flat disclike part 32 abutting the end of the ceramic body 11 and a tubular part 33 fitted within the opening 12 of the body. The insulating member 31 is held by a flat disclike metallic member 35 which is secured to a cylindrical member 34, positioned within the tubular part 33, by means of a screw 36. The member 35 serves in part as a terminal for the bushing and a conductor 37 may be received between the member 31 and the member 35 to connect the element of the capacitor to the bushing. The member 31 is of pressboard and serves to increase the leakage distance and flash over distance from the terminal member 35 to the container 16.

Referring now also to Fig. 4, the member 34 is connected to the latching member 30 by means of an arrangement which includes a spring 38, a fuse wire 39, and a fuse heolder 40. The fuse wire 39 is formed of a fusable metallic conducting material and has the lower end received in an opening 41 in the member 34 and is soldered thereto. The fuse wire is formed as a coil 42 which extends upwardly within the spring 38, through an opening 43 in the fuse tube 44, and about the shank portion of the latching member 30. The spring 38 is attached at its lower end to the member 34 by means of a threaded part 45 and is held at its upper end to the fuse holder 40 by means of a threaded collar 46 which is fitted over the reduced upper end portion of the fuse tube 44. The fuse tube 44 bears upon a bent portion 47 of the fuse wire and the spring 38 is under tension so that a withdrawal force is constantly exerted upon the part 48 of the fuse wire and upon the latching member 30.

The fuse tube 44 is formed of high strength insulating material such as phenolic canvas, phenolic paper, or ceramic and serves to confine the heat generated in the part of the fuse wire within the opening 43. The fuse wire is thus caused to melt at lower currents than would otherwise be possible and the fusing function is localized to that part of the fuse link which is enclosed within the fuse tube.

The latching member 30 has the end portions 49 and 50 of the arms of the member bent outward at a slight angle to engage the plate 23 when the diaphragm 22 is in its normal position with the locking member 29 projecting between the arms. The member 30 is therefore retained in position against the pull of the spring 38 which is exerted upon the clevis through the fuse holder 40 and the part 48 of the fuse wire 39. The chamber 24 is, however, in communication with the interior of the housing 16 through the opening 12 so that, as the pressure within the housing increases, the diaphragm 22 moves upwardly and away from the plate 23. When the pressure has increased sufficiently so that the diaphragm springs to its alternate position and the member 29 is withdrawn from between the arms of the member 30, the arms spring inwardly and the latching member is drawn downward to break the circuit between the terminal member 35 and the terminal member 19. Similarly, the circuit between the terminal members is broken when the portion 48 of the fuse wire 39 is melted and the fuse holder drawn downward by the spring 38.

An external conductor is connected to the terminal member 19 by means of two clamps 55 and 56 which are fitted over the part 20 in opposed relationship to form the conductor receiving openings 57 and 58. The clamps 55 and 56 are held by a nut 59 and have the compression thereon maintained by two Bellville washers 60.

The bushing is provided with an indicator for showing the condition of the breaker and of the capacitor apparatus with which the bushing is utilized. Specifically, the indicator comprises a telltale member 61, carried upon a bolt 62 which extends through an opening 63, longitudinally through the part 20 of the member 19, and is soldered to the diaphragm 22. When the diaphragm 22 moves to an upward position, so that the piece 30 is released, the part 61 is moved upwardly away from the upper end of the part 20 to indicate that the circuit breaker has been operated.

In operation, electric current flows to and from the external conductor and the capacitor elements 18, through the terminal member 19, the member 23, the member 30, the fuse wire 39, the member 34, the terminal member 35, and the conductor 37. If, during the operation of the capacitor, any of the elements 18 fail, by reason of a failure of the dielectric material of the condenser, so as to generate a gas, the reactive currents will not increase sufficiently to operate the fuse. However, over a period of time, the pressure in the interior of the housing 16 will increase sufficiently so that the diaphragm 22 is urged to its alternate position, thus withdrawing the locking piece 29 and releasing the latching member 30. The member 30 is thereupon drawn downward from contact with the plate 23 by the spring 38 to open the circuit. The movement of the diaphragm 22 moves the indicator 61 upward to show that a defective condition has occurred.

If, however, the nature of the failure is such that the average current to the capacitor elements is increased substantially, e.g. as by a complete short circuit of several of the elements, the current through the fuse wire 39 will increase to such a point that the portion of the wire within the fuse tube 44 will overheat and cause the fuse wire to melt. Thereupon, the spring 38 draws the fuse holder 40 downward to open the circuit between the member 34 and the piece 30. The increase in average current may be to such an extent that the fuse wire is overheated instantaneously or may be of a lesser value so that the overheating is cumulative by reason of the confining action of the fuse tube 44.

Referring now to Fig. 5, there is shown an alternate embodiment of the invention in which a bushing 65, which is similar in certain respects to the bushing 10 of Fig. 1, comprises an elongate ceramic member 66 having an opening 67 longitudinally through the member, and a plurality of petticoats or skirts 68 on the outside of the body. The body 66 is provided, at its upper end, with a terminal member 69, somewhat similar to the member 19 of Fig. 1, and soldered to the metallized upper end 70 and provided with a seal 71. The member 69 has a threaded part 72 over which is received two Bellville washers 73, conductor clamps 74 and 75, and a nut 76. A tapered lower portion 77 of the body 66 is soldered to an annular flange 78 of the housing 79.

The bushing 65 is provided, at its lower end and within the housing 79, with an insulating member 80 which has a tubular part 81 extending upward within the bore 67. A bellows 82 is carried by a rectangular frame 83, and is held adjacent to member 80 by the action of spring 87. The frame 83 has an opening 84 in the side of the frame adjacent the member 80 which receives a U-shaped piece 85, corresponding to the member 30 of Fig. 1, and a cooperating locking piece 86 carried by the bellows 82 corresponding to the piece 29 carried by the diaphragm 22. The clevis 85 has a spring 87 attached to its upper end by brazing.

The spring 87 is held at its upper end by a fuse holder 88, similar to the fuse holder 40 shown in Fig. 4. A fuse wire 89 passes through the fuse tube and is attached at its upper end to a stud 90 which is screwed into the terminal member 69. The fuse wire 89 is connected at its lower end to the clevis 85 by means of a conductor 91.

In operation, the bushing of Fig. 5 is substantially similar to that of the bushing in Fig. 1, except that the release of the latching member 85 is determined fully by the change in pressures within the housing 79 and the characteristics of the bellows 82. The diaphragm arrangement of Fig. 1, although subject to changes in external pressure, tends to operate stably at well defined changes in pressure upon the diaphragm since the characteristics of the diaphragm itself, in moving from one position to the alternate position, are subject to close control. While the characteristics of the bellows are somewhat less precise, the arrangement of Fig. 5 is nonetheless a great improvement over anything which has heretofore been known in the art.

The invention is not limited to the embodiments of Figs. 1 and 5, wherein both pressure controlled circuit interruption and current controlled circuit interruption is utilized. Either bushing may be adapted for use where only pressure controlled interruption alone is desired and there is shown in Fig. 6 an arrangement whereby the fuse holder is omitted and the upper end of the breaker spring connected directly to the upper terminal member. As shown in Fig. 6, the spring 93, corresponding to either the spring 38 or the spring 87, is held by a threaded bushing 94 which is riveted to a member 95. The member 95 may be the piece 30 of Fig. 1, or, in the embodiment of the invention of Fig. 5, may be a separate member which is held by the stud 90 and the terminal member 69. A separate conductor may be utilized as a shunt for the spring 93 because of relatively high resistance of the spring, although in certain applications the spring itself may be utilized as the conductor as in Fig. 6. Also, when practicing the embodiment of the invention of Fig. 1, without the fusing arrangement, the spring 93 may be brazed directly to the member 30 in the same manner as is shown in Fig. 5.

Similarly, the bushing may be utilized with current controlled interruption alone by omitting the diaphragm or bellows and connecting the fuse wire to the upper terminal member, as in Fig. 5, and the spring to the lower terminal member, as in Fig. 1.

Figure 7:
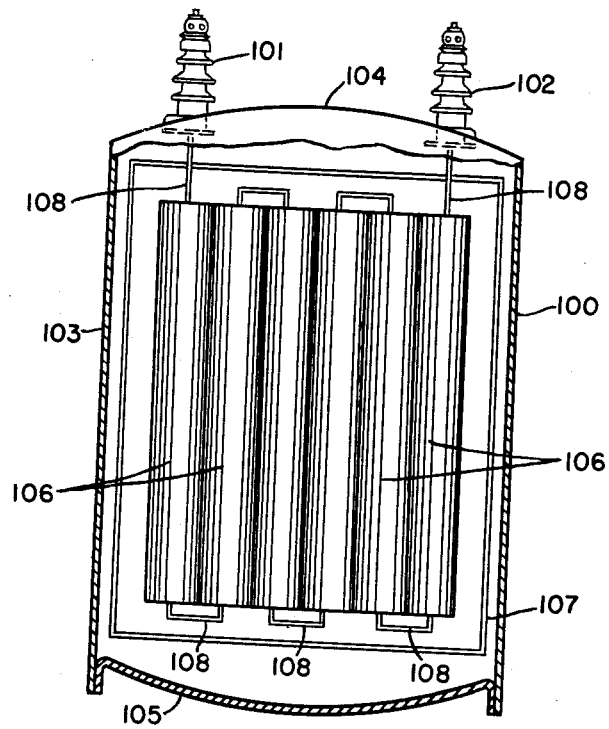
Fig. 7 is an elevation view, partly broken away, of a capacitor incorporating two bushings, at least one of which is constructed in accordance with the invention.
Figure 8:
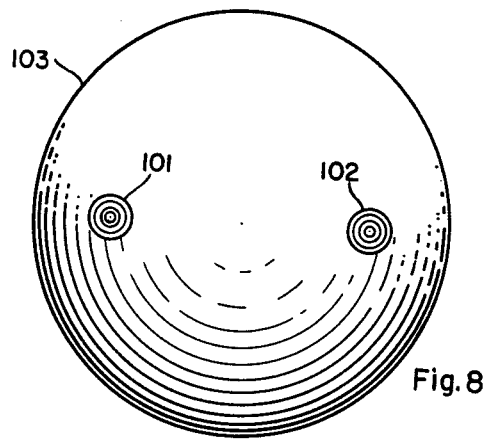
Fig. 8 is a top plan view of the capacitor of Fig. 7.

Referring now to Figs. 7 and 8, there is shown a capacitor 100, constructed in accordance with the present invention, in which two bushings 101 and 102, either or both of which may be, for example, the bushing of Fig. 1. The capacitor 100 comprises a housing 103 of sheet metal construction and having domed ends 104 and 105 which are adapted to impart sufficient strength to the housing in order to resist distention of the walls and volume changes with increase in internal pressure, such as might be caused by failure of a capacitor element.

The capacitor elements 106 are suitably mounted within the housing 103 and enclosed by a fiber member 107. The elements are connected to each other, in suitable series or parallel arrangement, and to the bushings 101 and 102 by means of conductors 108. The housing 103 is at least partially filled to immerse the capacitor elements in a suitable liquid dielectric medium such as mineral oil. Alternatively, a known gaseous insulating medium may be utilized.

The dielectric medium within the capacitor housing is designated in the claims as a fluid medium, whether composed entirely of liquid, entirely of a gas, or of a liquid in the lower part of the housing and a gas in the upper part of the housing.

Upon the failure of a capacitor element 106, an electric arc is formed between adjacent foil layers with a consequent generation of various gases. The particular gases generated will depend upon the nature either of the dielectric medium of the capacitor and of the paper which is utilized as the dielectric medium of the condenser element. Thus, for example, where the liquid dielectric medium of the capacitor is a mineral oil, the gases formed will be predominantly hydrogen, with water in the form of steam, and carbon dioxide; and, where a chlorinated diphenol is utilized, hydrogen-dioxide and carbon dioxide. The dielectric paper will produce complex hydro-carbons with gaseous hydrogen predominating, water, oxygen, and carbon dioxide. Whatever the particular gases generated, however, the mechanism is the same, e.g., the evolution of the gases by the arc produces an increase in the pressure within the housing 103.

Figure 9:
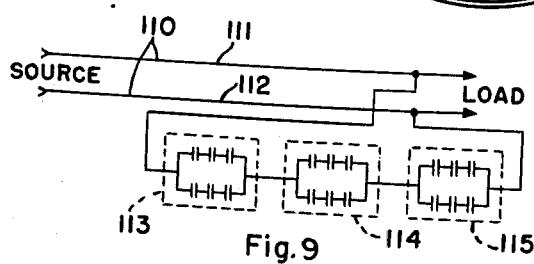
Fig. 9 is a diagram illustrating the manner in which the capacitor of the invention is employed in an electric power system.

The general mode of employment of the invention is illustrated in Fig. 9 wherein a line 110, comprising conductors 111 and 112, is provided for transmitting power currents from a source to a load. A bank of capacitors, comprising the capacitors 113, 114, and 115 connected in a series string, is connected in shunt with the line 110 to reduce the lagging power factor thereof and thereby improve the power handling capability of the line. The capacitors are permanently connected to the line 110 and are each provided with the indicator shown in Fig. 1. The operation of the system is such that the capacitor bank may be inspected at periodical intervals to determine the condition of the capacitors, e.g. whether there has been any failure in the capacitor bank.

It is to be understood that the foregoing description is not intended to restrict the scope of the invention and that various rearrangements of the parts and modifications of the design may be resorted to, giving effect to a liberal interpretation to the claims as herein set forth.

I claim:

1. A bushing for use with capacitors and the like comprising a ceramic body having a longitudinal opening, a first terminal means at the upper end of the body including and annular piece received over the body and attached thereto, a diaphragm and a piece extending transversely across the interior of the annular member and to form a chamber having the diaphragm as a wall thereof, and an opening in the piece communicating with the opening in the ceramic body for transmitting a pressure medium to the chamber, an elongate piece projecting upwardly from the annular member for receiving a connector and an opening longitudinally through the elongate piece, a member received in the opening and resting at the lower end thereof on the diaphragm and projecting from the upper end thereof from the elongate piece for indicating the relative position of the diaphragm, terminal means at the lower end of the ceramic body and means in the longitudinal opening of the ceramic body electrically connecting the said second terminal means with the said first terminal means.

2. A combined bushing and circuit interruption apparatus comprising a ceramic body having a longitudinal opening, a first terminal means at the upper end of the body including a cup shaped first annular member disposed over the body, and a transverse disclike member within the annular member abutting the ceramic body with an opening aligned with the opening of the body, and a diaphragm within the annular member forming chambers with the annular member and the disclike member respectively, a second terminal means at the lower end of the ceramic body comprising a disclike member with a cylindrical portion projecting into the opening in the ceramic body, and a cooperating disclike member with a cylindrical piece thereon received in the cylindrical part of the first disclike member, a U-shaped member of spring material having arms thereof received in the opening in the said first disclike member, and a locking piece carried by the diaphragm and projecting into the said opening in the arms of the U-shaped member to hold the U-shaped member in position against the disclike member, a helical spring attached at the one end thereof to the said piece of the said second terminal means, and means at the remaining end thereof attaching the spring to the said U-shaped member, and means electrically connecting the said second terminal means to the said U-shaped member.

3. The invention in accordance with claim 2 in which the said attaching means comprises a cylindrical member of insulating material with an opening longitudinally therethrough, a sleeve received over the cylindrical member with the spring threaded on the sleeve and the means connecting electrically comprises a wire of fusible material extending from the said piece of the second terminal means through the opening in the cylindrical piece of insulating material to the U-shaped member, the wire having means at the end of the cylindrical member away from the U-shaped member to receive the tension of the spring whereby excessive currents through the bushing will cause the wire to fuse within the cylindrical member and permit the spring to retract the insulating member to interrupt the circuit between the terminal means.

4. The invention in accordance with claim 2 in which the annular member of the first terminal means has an elongated piece projecting upward therefrom for receiving a connector, a longitudinal opening through the elongated piece, and a member in the opening operatively actuated by the diaphragm at the lower end thereof and projecting above the elongate piece at the upper end to serve as an indicator for the position of the diaphragm.

References Cited in the file of this patent

UNITED STATES PATENTS

| | | |
|---|---|---|
| 1,899,746 | Brown | Feb. 28, 1933 |
| 1,935,228 | Kopeliowitsch | Nov. 14, 1933 |
| 2,103,816 | Hart | Dec. 28, 1937 |
| 2,109,221 | Putman | Feb. 22, 1938 |
| 2,250,165 | Mitschrich | July 22, 1941 |
| 2,553,291 | Barr | May 15, 1951 |
| 2,678,361 | Mitchell | May 11, 1954 |
| 2,678,980 | Hitchcock | May 18, 1954 |